(12) United States Patent
Yang et al.

(10) Patent No.: US 10,045,016 B2
(45) Date of Patent: *Aug. 7, 2018

(54) LIP SYNC ERROR DETECTION AND CORRECTION

(71) Applicant: AT&T Intellectual Property I, L.P., Atlanta, GA (US)

(72) Inventors: Chen-Yui Yang, Marlboro, NJ (US); Chee Ching, Plano, TX (US); Paul Kahn, Morganville, NJ (US); David H. Lu, Irving, TX (US); Anthony Mark Srdar, Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,711

(22) Filed: Feb. 7, 2017

(65) Prior Publication Data

US 2017/0150141 A1 May 25, 2017

Related U.S. Application Data

(63) Continuation of application No. 12/945,250, filed on Nov. 12, 2010, now Pat. No. 9,565,426.

(51) Int. Cl.
*H04W 4/00* (2018.01)
*H04N 17/00* (2006.01)
*H04N 21/43* (2011.01)
*H04N 21/242* (2011.01)

(52) U.S. Cl.
CPC ......... *H04N 17/004* (2013.01); *H04N 21/242* (2013.01); *H04N 21/4307* (2013.01)

(58) Field of Classification Search
CPC .... H04J 3/0685; H04N 17/004; H04N 21/242
See application file for complete search history.

(56) References Cited

U.S. PATENT DOCUMENTS

| | | | |
|---|---|---|---|
| 3,945,718 | A | 3/1976 | Werner |
| 4,313,135 | A | 1/1982 | Cooper |
| 4,323,920 | A | 4/1982 | Collender |
| 5,387,943 | A | 2/1995 | Silver |
| 5,526,354 | A | 6/1996 | Barraclough et al. |
| 5,550,594 | A | 8/1996 | Cooper et al. |
| 5,621,772 | A | 4/1997 | Maturi et al. |

(Continued)

*Primary Examiner* — Samina Choudhry
(74) *Attorney, Agent, or Firm* — Jackson Walker L.L.P.

(57) ABSTRACT

A method of managing lip synchronization error in a multimedia content delivery network includes identifying a video packet and an audio packet associated with the video packet and determining a synchronization offset between the audio and video packets at a first monitoring point in the network. The audio and video packets are then detected at a second monitoring point in the network and a second synchronization offset is determined. When a delta between the first synchronization offset and the second synchronization offset exceeds a threshold, lip synchronization error information may be automatically recorded and/or reported to a service provider and corrective action may be taken if potential sources of the lip synchronization error are within the domain of the service provider. The video packet may be identified by a timestamp within the packet and the audio packet may be identified by audio data within the audio packet.

16 Claims, 6 Drawing Sheets

(56) References Cited

U.S. PATENT DOCUMENTS

| | | | |
|---|---|---|---|
| 5,642,171 A | 6/1997 | Baumgartner et al. | |
| 5,794,018 A | 8/1998 | Vrvilo et al. | |
| 5,915,091 A | 6/1999 | Ludwig et al. | |
| 5,940,352 A | 8/1999 | Moriguchi | |
| 5,982,830 A | 11/1999 | Maturi et al. | |
| 6,018,376 A | 1/2000 | Nakatani | |
| 6,122,668 A | 9/2000 | Teng et al. | |
| 6,181,383 B1 | 1/2001 | Fox et al. | |
| 6,191,821 B1 | 2/2001 | Kupnicki | |
| 6,269,122 B1 | 7/2001 | Prasad et al. | |
| 6,285,405 B1 | 9/2001 | Binford, Jr. et al. | |
| 6,330,286 B1 | 12/2001 | Lyons et al. | |
| 6,452,974 B1 | 9/2002 | Menon et al. | |
| 6,583,821 B1 | 6/2003 | Durand | |
| 6,862,044 B2 | 3/2005 | Kariatsumari | |
| 6,912,010 B2 | 6/2005 | Baker et al. | |
| 6,956,871 B2 | 10/2005 | Wang et al. | |
| 7,007,235 B1 | 2/2006 | Hussein et al. | |
| 7,020,894 B1 | 3/2006 | Godwin et al. | |
| 7,164,076 B2 | 1/2007 | McHale et al. | |
| 7,194,676 B2 | 3/2007 | Fayan et al. | |
| 7,400,653 B2 | 7/2008 | Davis et al. | |
| 7,436,456 B2 | 10/2008 | Morel et al. | |
| 7,486,658 B2 | 2/2009 | Kumar | |
| 7,551,839 B2 | 6/2009 | Yamada et al. | |
| 7,656,947 B2 | 2/2010 | Seo et al. | |
| 7,692,724 B2 | 4/2010 | Arora et al. | |
| 2003/0038807 A1 | 2/2003 | Demos et al. | |
| 2003/0122964 A1 | 7/2003 | Hara | |
| 2003/0164845 A1 | 9/2003 | Fayan et al. | |
| 2003/0193616 A1 | 10/2003 | Baker et al. | |
| 2003/0198256 A1 | 10/2003 | Wang et al. | |
| 2003/0234892 A1 | 12/2003 | Hu et al. | |
| 2004/0227855 A1 | 11/2004 | Morel et al. | |
| 2004/0264577 A1 | 12/2004 | Jung | |
| 2005/0042591 A1 | 2/2005 | Bloom et al. | |
| 2005/0053089 A1* | 3/2005 | Abou-Chakra | H04L 29/06 370/464 |
| 2005/0252362 A1 | 11/2005 | McHale et al. | |
| 2005/0281255 A1 | 12/2005 | Davis et al. | |
| 2005/0282580 A1 | 12/2005 | Tuori et al. | |
| 2006/0002681 A1 | 1/2006 | Spilo et al. | |
| 2006/0007356 A1 | 1/2006 | Junkersfeld et al. | |
| 2006/0012709 A1 | 1/2006 | Yamada et al. | |
| 2006/0018387 A1 | 1/2006 | Jung et al. | |
| 2006/0078305 A1 | 4/2006 | Arora et al. | |
| 2006/0236359 A1 | 10/2006 | Lee | |
| 2007/0025325 A1 | 2/2007 | Kumar | |
| 2007/0081562 A1* | 4/2007 | Ma | H04N 21/23406 370/516 |
| 2007/0081563 A1 | 4/2007 | Seo et al. | |
| 2007/0085575 A1 | 4/2007 | Cooper | |
| 2007/0153089 A1 | 7/2007 | Cooper et al. | |
| 2007/0153125 A1 | 7/2007 | Cooper et al. | |
| 2007/0220561 A1 | 9/2007 | Girardeau, Jr. et al. | |
| 2007/0223874 A1 | 9/2007 | Hentschel | |
| 2007/0237494 A1 | 10/2007 | Chen | |
| 2007/0245222 A1 | 10/2007 | Wang et al. | |
| 2007/0276670 A1 | 11/2007 | Pearlstein | |
| 2008/0005350 A1 | 1/2008 | Logvinov | |
| 2008/0040759 A1 | 2/2008 | She et al. | |
| 2008/0111887 A1 | 5/2008 | Cooper et al. | |
| 2008/0187282 A1 | 8/2008 | Brady et al. | |
| 2008/0260350 A1 | 10/2008 | Cooper | |
| 2008/0263612 A1 | 10/2008 | Cooper | |
| 2008/0291863 A1 | 11/2008 | Agren | |
| 2008/0298399 A1 | 12/2008 | Gou et al. | |
| 2009/0003379 A1 | 1/2009 | Shao et al. | |
| 2009/0073316 A1 | 3/2009 | Ejima | |
| 2009/0110370 A1 | 4/2009 | Shibata | |
| 2009/0168658 A1 | 7/2009 | Russell et al. | |
| 2009/0175180 A1 | 7/2009 | Yang et al. | |
| 2009/0178075 A1 | 7/2009 | Russell et al. | |
| 2009/0228941 A1 | 9/2009 | Russell et al. | |
| 2010/0005501 A1 | 1/2010 | Stokking et al. | |
| 2010/0064316 A1 | 3/2010 | Dai et al. | |
| 2011/0217025 A1* | 9/2011 | Begen | H04N 5/931 386/338 |
| 2011/0261257 A1* | 10/2011 | Terry | G06K 9/00221 348/515 |

\* cited by examiner

LIP SYNC ERROR DETECTION AND CORRECTION

This application is a continuation of U.S. patent application Ser. No. 12/945,250, filed Nov. 12, 2010, which is herein incorporated by reference in its entirety.

FIELD OF THE DISCLOSURE

The present disclosure relates to the field of multimedia content delivery networks and, more particularly, synchronizing audio and video components of multimedia content delivered over a multimedia content delivery network.

BACKGROUND

When multimedia content is delivered over a distribution network to a plurality of end users, whether via satellite, cable, twisted copper, fiber, or another medium, audio components and video components may be segregated to improve network efficiencies. However, when segregated audio and video packets are transported across the network, random and systematic sources of error or delay may affect video and audio packets differently and can, therefore, negatively impact the synchronization. Because the most common or recognizable manifestation of the problem may be a detectable difference in timing between the visual perception of the movement of a speaker's lips and the audio perception of the corresponding sound, this problem is commonly referred to as lip synchronization error or, more simply, lip sync error.

DESCRIPTION OF THE EMBODIMENT(S)

Figure 1:
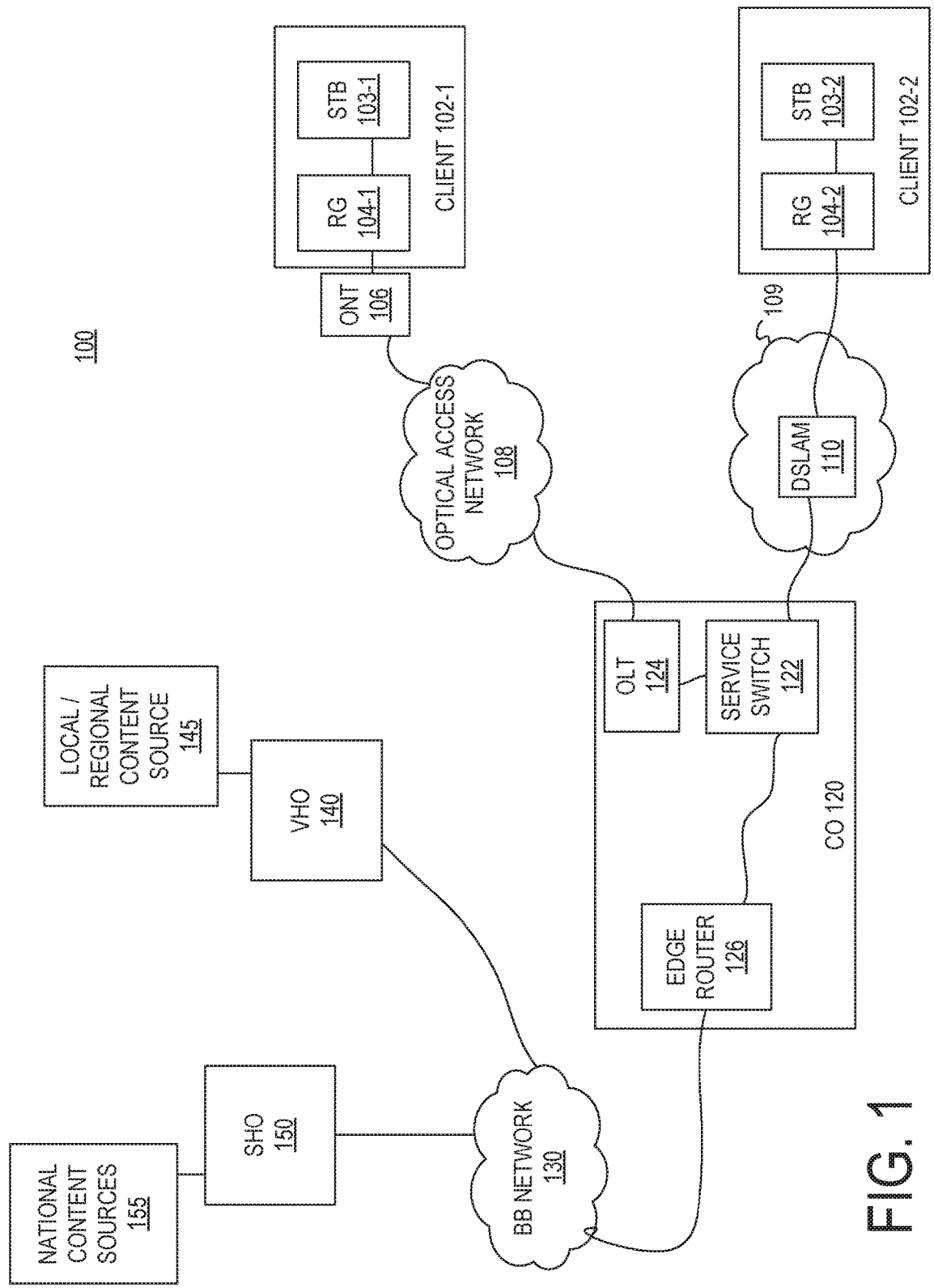
FIG. 1 is a block diagram of selected elements of an embodiment of a multimedia content delivery network configured with automatic lip sync error detection/correction resources.

A disclosed method of managing lip synchronization error in a multimedia content delivery network (MCDN) includes identifying a video packet and an audio packet associated with the video packet and determining a synchronization offset between the video packet and the audio packet at a first monitoring point in the network. The video packet and the audio packet are then detected at a second monitoring point in the network and a second synchronization offset between the video packet and the audio packet is determined. When a delta between the first synchronization offset and the second synchronization offset exceeds a threshold, lip synchronization error information is automatically reported to a service provider and corrective action may be taken if potential sources of the lip synchronization error are within the domain of the service provider.

Identifying the video packet may include identifying a timestamp associated with the video packet. The video packet may be encoded according to a motion pictures expert group (MPEG)-compliant video encoding and the timestamp may include a presentation timestamp (PTS). A PTS is a metadata field in an MPEG program stream that is used to achieve synchronization of elementary streams at an end point of the network.

The audio packet may be encoded according to an MPEG-compliant audio encoding and the audio packet may be identified based on pulse code modulation data in the packet. In some implementations, the audio packet and the video packet occur contemporaneously or substantially contemporaneously in a multimedia content program. In these embodiments, the synchronization offset that is monitored may be relatively small or minor at an upstream monitoring point in the network unless there is lip sync error in the content as received from a content provider.

Determining a synchronization offset may include associating a network timestamp with the video packet and a network timestamp with the audio packet and determining a difference between the video packet network timestamp and the audio packet network timestamp. Associating a network timestamp with the video packet may include assigning a network time protocol (NTP) timestamp to the video packet while or when the video packet is being processed at a first monitoring point. Similarly, associating a network timestamp with the audio packet may include assigning an NTP timestamp to the audio packet while or when the video packet is being processed at a first monitoring point.

In another aspect, a disclosed audio/video synchronization server, suitable for use in automatically detecting lip sync error in an MCDN, includes a general purpose, embedded, or other form of processor having access to computer readable storage media. Instructions, embedded or otherwise stored in the storage medium and executable by the processor, include instructions to identify a video packet and an audio packet, determine a synchronization offset between the video packet and the audio packet at first and second monitoring points in the network, and, when a delta between the first and second synchronization offsets exceeds a predetermined threshold, logging synchronization data indicative of the audio and video packets and the synchronization offset. Some embodiments may include instructions to compensate for the synchronization offset delta by adding packets to either a video stream carrying the video packet or an audio stream carrying the audio packet.

In some implementations, the first monitoring point includes an encoder of the MCDN and the second monitoring point comprises a central office switch. In addition, a synchronization offset between the second monitoring point and a third monitoring point may be determined. The third monitoring point may include customer premises equipment at a client site of the network.

Embodiments of the lip sync error detection and correction methods described herein may feature MPEG implementations, i.e., implementations that operate on MPEG-compliant multimedia content. Accordingly, aspects of MPEG are described herein. The output of a single MPEG audio or video encoder is called an elementary stream. An elementary stream is an endless, near real-time signal. An elementary stream may be broken into data blocks of manageable size, referred to as a packetized elementary stream (PES). A video PES and one or more audio PESs can be combined to form a program stream. Packets in a PES may include header information to demarcate the start of each packet and timestamps to resolve time base disruptions caused by the packetizing itself.

For transmission and digital broadcasting, several programs and their associated PESs can be multiplexed into a single transport stream. A transport stream differs from a program stream in that the PES packets are further subdivided into short fixed-size packets, referred to herein as transport packets. MPEG transport packets are fixed-size data packets, each containing 188 bytes. Each transport stream packet includes a program identifier code (PID). Transport stream packets within the same elementary stream will all have the same PID, so that the decoder (or a demultiplexer) can select the elementary stream(s) it wants and reject the remainder. Packet continuity counts ensure that every packet that is needed to decode a stream is received. An effective synchronization system is needed so that decoders can correctly identify the beginning of each packet and deserialize the bit stream into words.

An MPEG transport stream may carry packets for multiple programs encoded with different clocks. To enable this functionality, a transport stream includes a program clock reference (PCR) mechanism that is used to regenerate clocks at a decoder. In MPEG-2, timing references such as the PTS are relative to the PCR. A PTS has a resolution of 90 kHz, which is suitable for the presentation synchronization task. The PCR has a resolution of 27 MHz which is suitable for synchronization of a decoder's overall clock with that of the usually remote encoder.

Despite the use of timestamps and clock references, lip sync error can occur when multimedia content is delivered by multicasting a multi-program transport stream over a wide area, best-efforts network to a plurality of users, who may receive the content via access networks that employ different media including, as examples, twisted pair wire, co-axial cable, and/or fiber optic cables.

Lip sync error may result from the accumulation of video delays at several locations in the delivery network when no provision for compensating audio delay is made. Lip sync error may include different types of lip sync error such as valid content lip sync error, provider-introduced lip sync error, lip sync error induced by NTP induced PCR offset and jitter, and even MPEG-2 time-stamp missing packet errors.

Disclosed herein are methods and systems enabled to automatically detect and, when feasible, remediate lip sync error. Automated lip sync error detection/correction alleviates the need for costly and time consuming intervention by a network engineer or technician. Disclosed lip sync error detection/correction system and methods include systems and methods for measuring and monitoring parameters indicative of lip sync error at multiple points in a network as well as ongoing attention to evolving solutions and standards. Lip sync error auto detection and correction may encompass content delivered via different transmission media. For example, lip sync error may occur when television content is transported via a first medium, e.g., a geosynchronous satellite radio link, having significantly different delay times than content delivered via a second medium, e.g., landline. The lip sync error methods and system disclosed herein may delay the earlier of the two signals electronically to compensate for different propagation times.

Automated lip sync error detection may implement an MPEG analyzer to monitor the video PTS timing and measuring frame delay with respect to a reference. When a stream experiencing lip sync error is compared to the reference, the audio lead or lag may be quantified and flagged if greater than a predetermined threshold (e.g., a quarter of a second, which is sufficient to be easily perceived).

In some cases, automated lip sync error isolation disclosed herein may identify the content provider or the service provider as the source of a lip sync error problem. A content provider may be identified as a source of a lip sync error when a headend receiver detects lip sync error, in the form of audio leading or lagging video, in content received from a content provider. A service provider may be identified as a lip sync error source when, for example, a headend encoder or receiver incorrectly inserts a video PTS that is out of alignment with an audio PTS or out of sync with the timing sync on a set top box (STB). A headend receiver may also discard serial digital interface (SDI) packets pre-encoder, causing the encoder to insert or stuff null packets into the multicast stream in order to maintain a constant bit rate. If sufficient null packets are stuffed into the post-encoder multicast stream, time misalignment sufficient to produce lip sync error may occur. Lip sync error can even result when network timing errors are caused by network elements that block NTP packets. Automated correction of lip sync error attributable to the service provider may include adding frames to either the video or audio components either within the receiver or at the encoder.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

FIG. 1 depicts selected elements of an embodiment of a multimedia content delivery network (MCDN) 100 configured with functionality for automatically detecting and correction lip sync error. Although the description of MCDN 100 presented herein emphasizes the ability to distribute multimedia content, embodiments of MCDN 100 are also configured to provide data services, including broadband Internet access and email service, and voice services including voice-over IP (VoIP) services. For the sake of clarity, functional elements supporting data and voice services are omitted from FIG. 1.

In the depicted embodiment of MCDN 100, multimedia content is distributed from an upstream location such as super headend office (SHO) 150 and video headend office (VHO) 140, across a backbone network 130 to central offices (COs) 120 (only one of which is depicted in FIG. 1). MCDN 100 as depicted in FIG. 1 encompasses distribution of multimedia content from CO 120 to clients 102-1 and 102-2 over two different implementations of access networks, namely, an optical access network 108 delivering content to client 102-1 and a digital subscriber line (DSL) based access network 109 delivering content to client 102-2.

In the case of DSL, content is sent from CO 120 to one or more DSL access multiplexer(s) (DSLAM(s)) 110, only one of which is depicted, and then to residential gateway (RG) 104-2 and STB 103-2 at client 102-2 via DSL access network 109, which may be implemented with twisted copper pair transmission medium.

In the case of an optical access network 108, content may be sent from an optical line terminal (OLT) 124 to an optical network termination (ONT) 106, which may be located at the exterior of a premises of a subscriber associated with client 102-1. ONT 106 converts optical signals to electrical signals and provides the electrical signals to RG 104-1 and STB 103-1, which may be functionally equivalent or similar to RG 104-2 and STB 103-2 in client 102-2.

Depending upon the implementation, CO 120 may include one or more switches and/or routing devices including, for example, a multiservice edge router 126 that couples CO 120 to backbone network 130. In the depicted embodiment, edge router 126 connects to one or more service switches 122 that provides an interface between CO 120 and one or more DSLAMs 110. In the embodiment depicted in FIG. 1, OLT 124 is shown connected to service switch 122 to support optical access network 108 connecting CO 120 to ONT 106. Edge router 126 may have some functional features similar to functional features found in commercially distributed edge routers including, as an example, an Alcatel-Lucent 7550 service router. Similarly, service switch 122 may have functional features similar to functional features found in commercially distributed service switches including, as an example, an Alcatel-Lucent 7450 Ethernet service switch.

One or more of the switches and routers of CO 120 may include hardware and or software to implement or facilitate auto detecting and/or correction of lip sync error of multimedia content. In these embodiments, service switch 122 and/or edge router 126 may include a general purpose or embedded processor and computer readable storage for storing processor executable instructions to perform all or some of the lip sync error detection and correction methods and procedures. Similarly, lip sync error detection and correction modules may be included in upstream resources including SHO 150 or VHO 140 and in downstream resources including RG 104 and/or STB 103.

Referring now to upstream portions of MCDN 100, SHO 150 receives content from national content sources collectively represented by referenced numeral 155. In some embodiments, SHO 150 provides "national" feed content including nationally distributed television channels including, as examples, TBS, USA, CNN, CSPAN, and the like. VHO 140 may encompass providers of regional or local content delivered from regional or local sources collectively represented as regional sources 145.

In some embodiments, national feed content provided via SHO 150 may be received by and/or delivered from SHO 150 via different media than regional/local content delivered to and distributed by VHO 140. National feed content may, for example, be delivered to SHO 150 via a satellite transmission while content may be delivered to VHO 140 via terrestrial broadcast, coaxial cable, twisted copper, optical fiber and so forth. Moreover, although FIG. 1 depicts a tiered network in which one or more SHOs 150 provides national content and one or more VHOs 140 provides local/regional content, other embodiments may omit any such tiering. Similarly, although FIG. 1 depicts national feed content from SHO 150 being delivered to CO 120 directly via backbone network 130, other embodiments may deliver national feed content from SHO 150 to VHO 140, with VHO 140 aggregating and distributing all of the content to CO 120 for end use distribution over access networks 108 and 109 to clients 102.

Figure 2A:
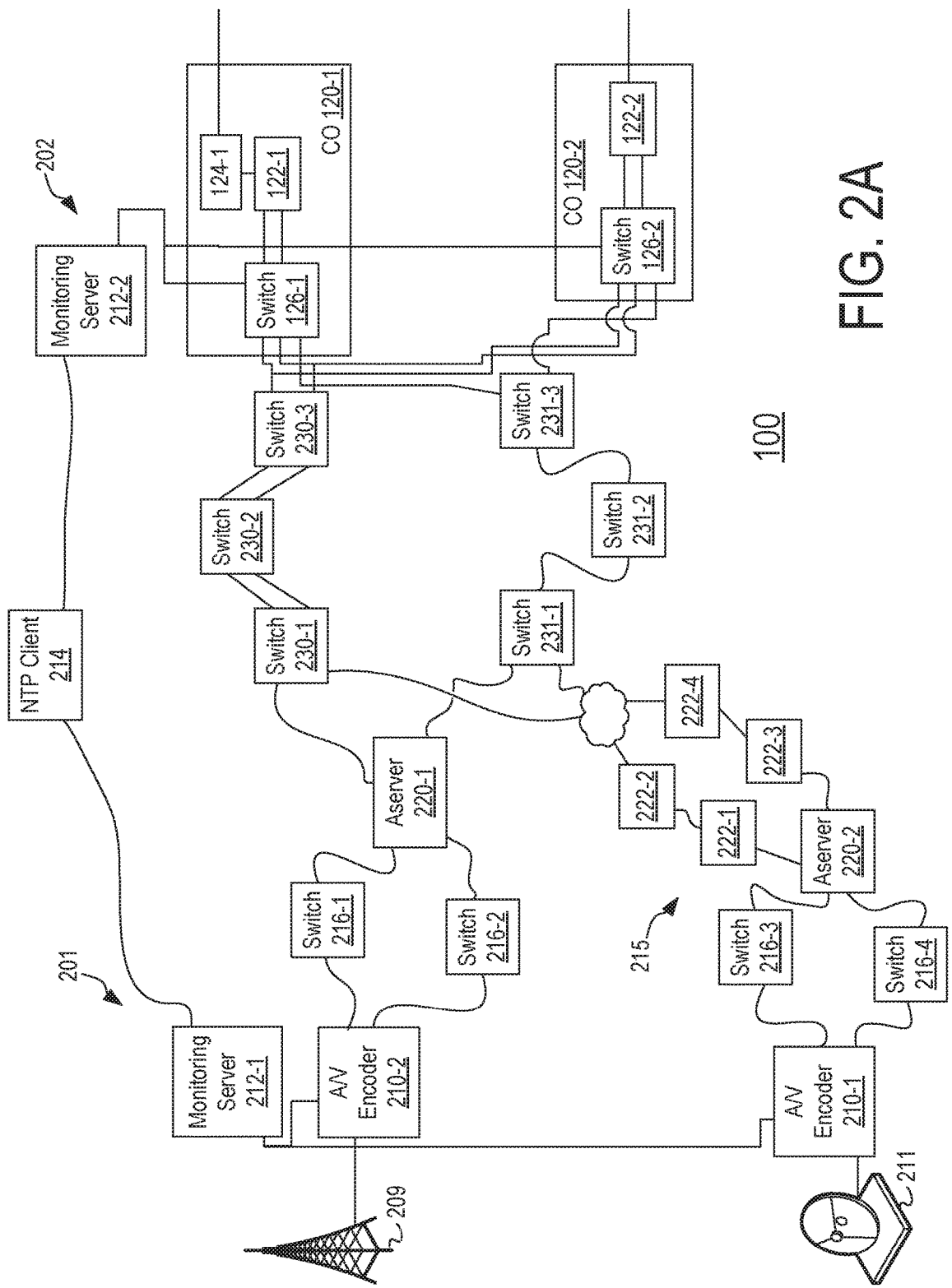
FIG. 2A and FIG. 2B are an alternative block diagram of selected elements of an embodiment of a multimedia content delivery network configured with automatic lip sync error detection/correction resources.
Figure 2B:
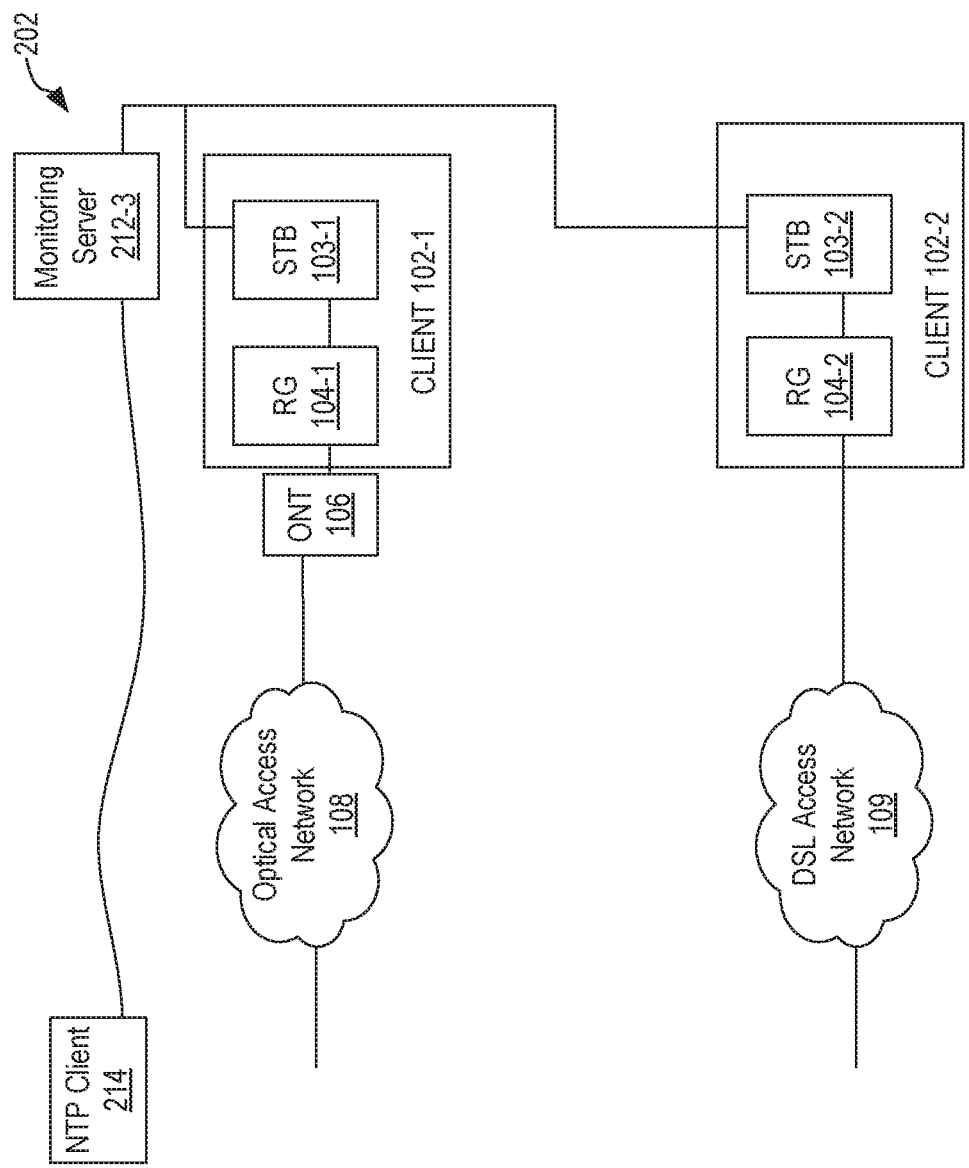

Referring now to FIG. 2A and FIG. 2B, selected elements of MCDN 100 are depicted to emphasize features of MCDN 100 for automatically detecting lip sync error and taking corrective action. FIG. 2A and FIG. 2B depict monitoring servers 212 implemented at exemplary monitoring points within MCDN 100 for monitoring lip sync error. Monitoring servers 212 are preferably located to identify the precise sources of lip sync error within MCDN 100 with a minimum number of monitoring points. Although it would be impracticable to implement lip sync error monitoring at every network device within MCDN 100, lip sync error monitoring points may be provided at key locations in the network to gather valuable information regarding the sources of lip sync error. In the depicted embodiment, an upstream lip sync error monitoring point is provided via a monitoring server 212-1, a mid-stream monitoring point is provided via monitoring server 212-2 and a downstream monitoring point is provided via monitoring server 212-3. However, although the implementation depicted in FIG. 2A and FIG. 2B illustrates certain specific locations in MCDN 100 as lip sync error monitoring points, other embodiments may employ more, fewer, and/or different monitoring points.

The embodiment of MCDN 100 depicted in FIG. 2A and FIG. 2B again illustrates a distinction between national feed content, which is shown in FIG. 2A and FIG. 2B as being transmitted from a satellite dish receiver 211 to an encoder 210-1, which encompasses an audio encoder and a video encoder. In contrast, regional/local content is shown being received by terrestrial broadcast tower 209 coupled to audio/visual encoder 210-2.

In some embodiments, monitoring servers 212 may include features and functionality similar to or analogous to features found in commercially implemented element management systems such as the ROSA video service manager from Cisco, Inc. Monitoring servers 212 may be configured to detect and identify individual network packets. Monitoring servers 212 may be further configured to interact with a source of timing that is external to MCDN 100. In some embodiments, for example, monitoring servers 212 may implement or be configured to communicate with an NTP client 214. NTP client 214, as suggested by its name, is a network element configured to communicate NTP messages with one or more NTP servers. NTP is a protocol for synchronizing clocks in a computer network. See, e.g., Network Time Protocol (Version 3), Internet Engineering Task Force RFC 1305 (1992). In Unix environments, NTP client 214 may be implemented as a daemon process that runs continuously in user space. In a Windows® environment, NTP client 214 may be implemented within Windows® time service. NTP employs 64-bit timestamps that have a theoretical resolution of approximately 200 picoseconds although the accuracy of actual NTP implementations may be closer to approximately 10 milliseconds over the Internet and 200 microseconds over a local area network.

In some embodiments, MCDN 100 is configured to detect lip sync error and take corrective action, whenever possible, to compensate for or otherwise correct any lip sync error detected. As depicted in FIG. 2A and FIG. 2B, MCDN 100 implements three monitoring points for local/regional content and three monitoring points for national content. Segregating local and national feed contents for the purpose of automatic lip sync error detection and correction may provide information regarding the sources of lip sync error in MCDN 100. If, for example, local feed content and national feed content arrive at an intermediate monitoring point in MCDN 100, any difference in lip sync error detected between these packets may be attributable to the original content provider or to a portion of MCDN 100 that is upstream of a national/local junction point. In FIG. 2A, for example, switch 230-1 represents a national/local junction because national feed content and local/regional content meet at switch 230-1 and traverse the same network elements as they progress downstream from switch 230-1.

In some embodiments, encoders 210 implement and/or support one or more levels of MPEG video encoding. Some embodiments, for example, may support MPEG-2 encoding, MPEG-4 encoding, and additional encodings. Encoders 210 may further include audio encoders that may support MPEG-1 levels 1, 2, and 3 as well as MPEG-2 Audio, and MPEG-4 Audio.

In the embodiment depicted in FIG. 2, local/regional content encoded by audio/video encoder 210-1 is sent, in parallel, to switches 216-1 and 216-2, which provide redundancy to support high availability. Content from switches 216-1 and 216-2 are provided to an acquisition server (A-server) 220-1. From A-server 220-1, local/regional content is delivered through a series of primary path switches 230-1, 230-2, and 230-3. From switch 230-3, content is delivered in parallel to a set of CO switches 126-1, 126-2, etc. Each CO switch 126 is associated a corresponding CO 120. FIG. 2A also depicts secondary or redundant path switches 231-1, 231-2, and 231-3, between acquisition server 220-1 and CO switches 126-1 through 126-n. The distribution path provided by second path switches 231 may be employed in the event of a failure of one or more switches 230 in the primary path or any associated network elements.

For optical access networks, content may be routed from CO switch 126-1 through service switch 122-1 to OLT 124-1 for conversion from an electrical signal to an optical signal. Content is then delivered from service switch 122-2 to client 102-2 over DSL access network 109 from OLT 124 to client 102-1 via optical access network 108 and ONT 106 as described above with respect to FIG. 1.

National content is depicted in FIG. 2A as being received by satellite dish receiver 211 and provided to a national feed audio/video encoder 210-1. National content may then be provided from SHO encoder 210-1 through a national feed backbone 215 to switch 230-1. National feed backbone 215 as depicted includes switches 216-3 and 216-4 receiving content from audio/video encoder 210-1 in parallel and providing the content to an A-server 220-2, which routes the national feed content to junction switch 230-1 via a first path that includes service switches 222-1 and 222-2 and a parallel path that includes service switches 222-3 and 222-4. FIG. 2A also depicts national content feed being routed to secondary path switches 231-1, 231-2, and 231-3 from national feed backbone 215.

Figure 3:
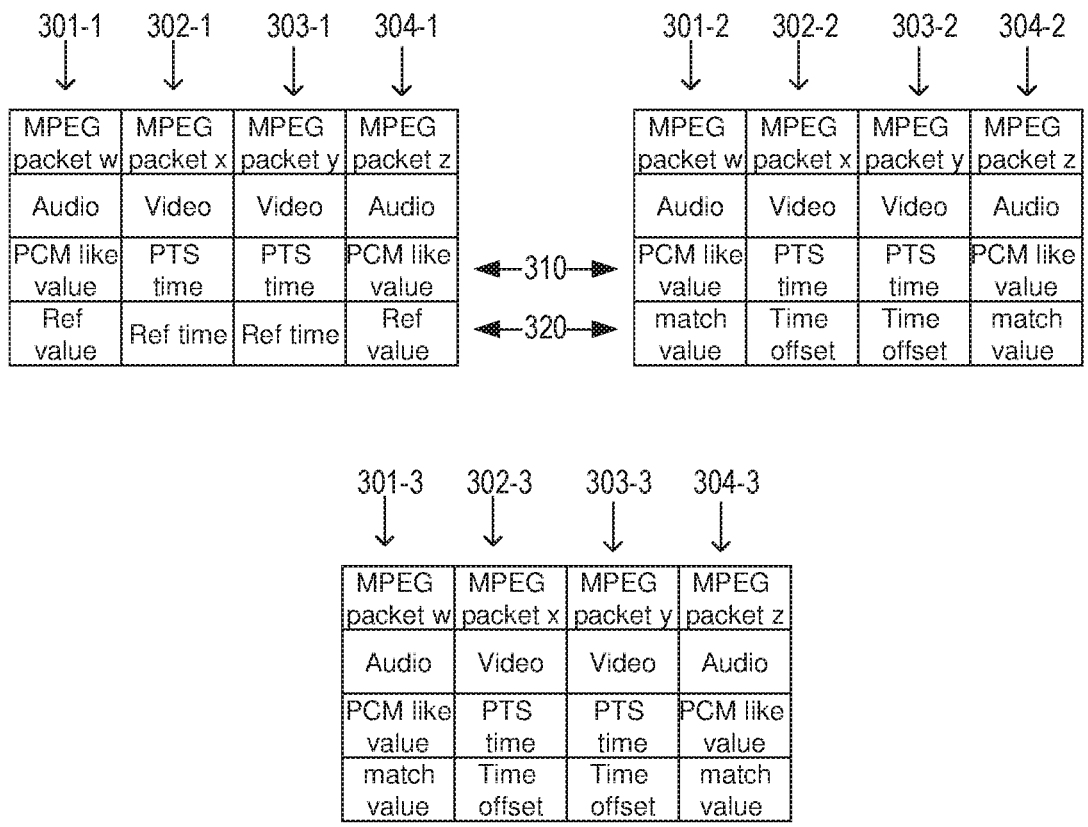
FIG. 3 is a block diagram of audio and video packets being monitored for lip sync error at different monitoring points in the multimedia content delivery network.

Referring now to FIG. 3, audio and video packets are depicted at various monitoring points in MCDN 100. In the depicted implementation, automated lip sync error monitoring occurs at three locations in MCDN 100, namely, at a headend location, at a CO location, and at an STB location. In other embodiments, monitoring may occur at more, fewer, or different locations than those described herein. The embodiment represented in FIG. 3 represents an MPEG implementation in which audio and video packets are encoded using MPEG-compliant audio and video encoders. MPEG-compliant video encoders include, without limitation, MPEG-2 and MPEG-4. MPEG-compliant audio encoders include, without limitation, MPEG-1 Level 1, MPEG-1 Level 2, MPEG-1 Level 3, MPEG-2 Audio, and MPEG-4 Audio.

MPEG describes stream packets and transport packets. Stream packets are relatively large, variable-sized packets that represent a meaningful grain of the content. The packets in a video stream, for example, may represent a frame of the content, i.e., one entire image or screen. As content is transported over MCDN 100, however, MPEG-compliant devices generate transport streams that include a series of relatively small, fixed-size packets referred to as transport packets. Each MPEG transport packet contains 188 bytes, which includes a header and a payload. The packets illustrated in FIG. 3 may represent audio and video transport packets from MPEG audio and video transport streams.

FIG. 3 depicts four transport stream packets at three different monitoring points in MCDN 100. A national feed audio packet 301 is indicated by reference numeral 301-1 at monitoring point 1, 301-2 at monitoring point 2, and 301-3 at monitoring point 3. A national feed video packet 302 is indicated by reference numeral 302-1 at monitoring point 1, 302-2 at monitoring point 2, and 302-3 at monitoring point 3. A local/regional feed video packet 303 is indicated by reference numeral 303-1 at monitoring point 1, 303-2 at monitoring point 2, and 303-3 at monitoring point 3. A local/regional feed audio packet 304 is indicated by reference numeral 304-1 at monitoring point 1, 304-2 at monitoring point 2, and 304-3 at monitoring point 3.

Associated with each packet depicted in FIG. 3 is identifying information 310 and reference timing information 320. Identifying information 310 refers to information that is a part of the packet and may be used to identify the packet at the various monitoring points. As depicted in FIG. 3, for example, identifying information 310 includes pulse code modulation (PCM) like values for audio packets 301 and 304 and PTS values for video packets 302 and 303. The reference timing information 320 represents a timing value that may be used to determine synchronization errors. In one embodiment, for example, the reference timing values 320 may be network based timestamps that are assigned to or otherwise associated with the individual packets. As described above, for example, MCDN 100 may include one or more monitoring servers 212 that communicate with NTP clients 214 to assign NTP-compliant timestamps to selected packets.

In some implementations, the automated detection and correction of lip sync error is implemented as an application or service that is distributed across various elements in MCDN 100. In the depicted implementations, for example, the network points identified for monitoring may each include a processor and software or access to software containing instructions to perform a lip sync error detection and correction application. Also, as described above with respect to FIG. 2, elements in MCDN 100 may include element management applications as well as NTP clients or support. These elements may be leveraged by the automatic lip sync error detection and correction modules described.

Figure 4:
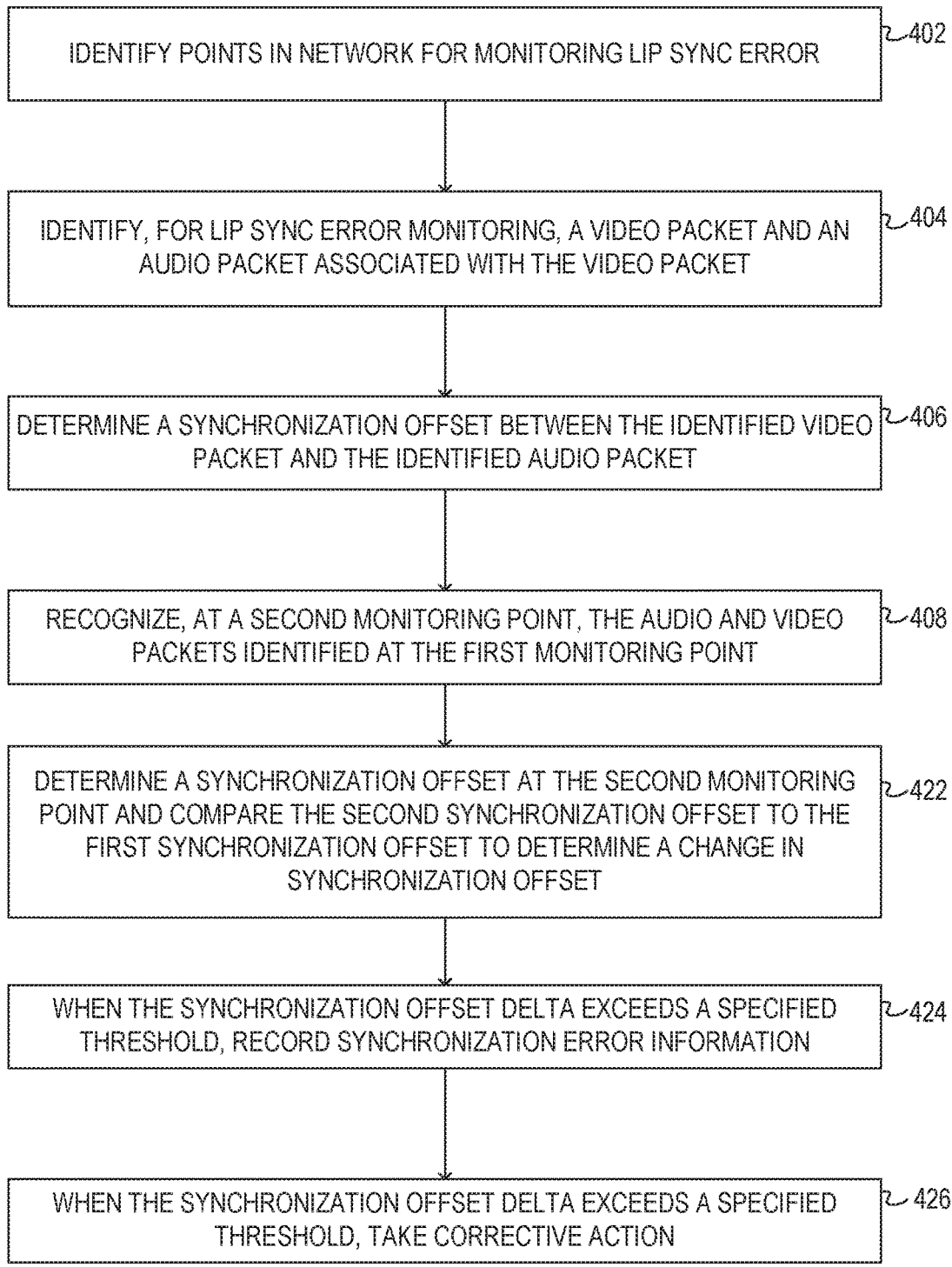
FIG. 4 is a flow diagram of selected elements of a method of automatically detecting lip sync error in a communication network.

When executed by the applicable one or more processor(s), the automated lip sync error detection and correction described herein may be implemented as a method 400 represented by the flow diagram of FIG. 4. Method 400 will now be described in conjunction with FIG. 2, FIG. 3, and FIG. 4. In some embodiments, method 400 may include identifying (block 402) points in MCDN 100 for automatically monitoring lip sync error. In some implementations, monitoring points are predetermined and step 402 is omitted. The identified monitoring points may be selected to provide meaningful lip sync error data while maintaining control over the number of monitoring points. Thus, for example, MCDN 100 may be characterized as having an upstream portion, a mid-stream portion, and a downstream portion and monitoring points may be selected in each of the recognized network portions. As implemented in FIG. 2A and FIG. 2B, for example, the encoders 210 are part of an upstream portion 201 of MCDN 100, COs 120-1 and 120-2 are part of a midstream portion 202 of MCDN 100, and STBs 103 are part of a downstream portion of MCDN 100. Selecting upstream, mid-stream, and down stream monitoring points beneficially isolates any detected lip sync error sources to major functional and physical sections of MCDN 100 while maintaining a reasonable number of monitoring points. Although the depicted embodiment employs three monitoring points located as discussed above, other embodiments may have more, fewer, and/or different monitoring points than those discussed above.

After identifying the lip sync error monitoring points in block 402, the embodiment of method 400 depicted in FIG. 4 includes identifying (block 404) at least one video packet and at least one audio packet for monitoring. In some embodiments, the selected audio and video packets are associated with one another. In some embodiments, for example, the identified video packet might correspond to an image or frame within the stream of content and the identified audio packet might correspond to the audio component that occurs contemporaneously with the frame. Although it is not strictly necessary that the identified audio and video packet represent contemporaneously occurring content or, at least, represent content from the same multimedia program, lip sync error detection based on audio and video from different multimedia programs may be more difficult to achieve.

Identifying audio and video packets in block 404 may be facilitated by leveraging or extending functionality that is implemented in a video service management tool such as the ROSA video service manager from Cisco, Inc. In some embodiments, the identification of audio and video packets may be based, in part, on the encoding scheme employed by encoders 210. Embodiments that employ, for example, MPEG-2 video encoding, may identify a video packet based, at least in part, on temporal or timestamp information contained in the video packet itself. In the case of MPEG-2 video, for example, a video packet may include PTS information that is highly indicative, if not absolutely indicative of the packet itself. In some embodiments, PTS information in a video packet may be combined with other information to further identify the packet of interest. The PTS information in an MPEG-compliant video encoded packet is a 33-bit value representing a sample of a counter that increments at 9 kHz. Because the PTS value increases monotonically as the content progresses, the PTS is highly indicative of the corresponding packet. Moreover, as suggested above, PTS data may be combined with additional packet data to further refine the identification of specific packets.

In block 404 of the embodiment of method 400 depicted in FIG. 4, an audio packet associated with the identified video packet is also identified for lip sync error detection. In MPEG-1 Level 2 (MP-2) audio encoding, for example, an audio stream packet contains 32 sets of PCM data values representing samples taken in each of 32 corresponding frequency subbands. Packets in MP-2 audio encoded streams included PCM data for 1152 samples and may be used to identify an audio packet.

The depicted embodiment of method 400 further includes determining (block 406), at the first monitoring point, a synchronization reference between the identified video packet and the identified audio packet. The synchronization reference may represent the difference between network-based timestamps associated with the identified video and audio packets. In some embodiments, for example, the lip sync error monitoring server 212-1 at first monitoring point 201 implements or is configured to invoke an NTP client 214 to obtain network based timestamps for selected packets. In some embodiments, lip sync error detection method 400 may include obtaining NTP timestamps for the identified video and audio packets at first monitoring point 201. Any audio/video synchronization difference detected at first monitoring point 201 may represent synchronization offset that is undetectable, inherent in the content as received from the content provider, or both. The synchronization offset that is determined at first monitoring point 201 is taken as the baseline synchronization offset.

Block 408 of the embodiment of method 400 depicted in FIG. 4 includes recognizing or otherwise detecting the audio and video packets at the second monitoring point in MCDN 100. In the embodiment discussed above with respect to FIG. 2, for example, the second monitoring point is the midstream monitoring point located at the CO switches 126. This monitoring point represents an approximation of a boundary between the multimedia content delivery service provider's backbone network and the access networks. The recognition of audio and video packets at second monitoring point 202 may be accomplished with a video services management tool or module located on or otherwise stored in the computer storage of a midstream monitoring server 212-2. In some embodiments, midstream lip sync error server 240 may leverage or invoke video service management techniques or resources equivalent or similar to analogous resources employed at first monitoring point 201.

Method 400 as shown further includes determining (block 422) a synchronization offset between the recognized audio and video packets. In the absence of network processing errors including, as examples, dropped packets, cyclic redundancy check (CRC) errors, and other network-based errors, one would not expect to see any substantial change in the synchronization offset that was present at first monitoring point 201. If, however, an appreciable shift in synchronization offset is detected, the shift may be categorized as lip sync error. The determination of lip sync error at second monitoring point 202 would tend to indicate that processing in the service provider's backbone network is causing or otherwise generating lip sync error into content.

When an appreciable change or delta in the synchronization offset between the identified packets is detected at second monitoring point 202, the synchronization offset shift may be stored to or otherwise recorded (block 424) to computer readable storage for subsequent analysis. In some embodiments, detection of appreciable changes in synchronization offset between first monitoring point 201 and second monitoring point 202 may trigger initiation of a corrective action procedure (block 426). Corrective action might be performed, for example, by a monitoring server 212-2 at monitoring point 202 and may include, for example, injecting empty or null packets into the component of content that is leading or lagging as appropriate. Corrective action may also include initiating a trouble ticket or otherwise notifying a service provider and/or a content provider of the lip sync error, and notifying a subscriber if and when lip sync error is detected and if and when a trouble ticket is initiated.

Figure 5:
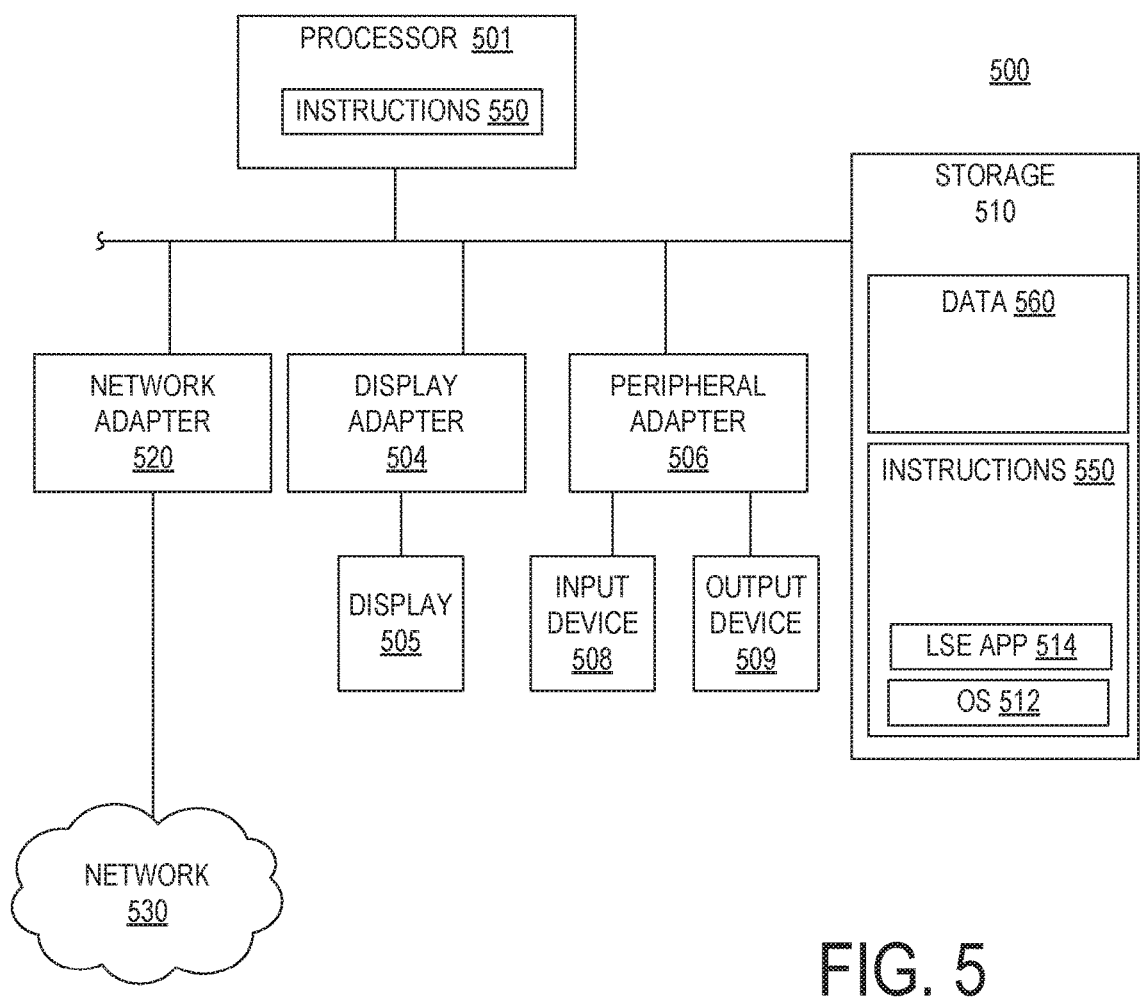
FIG. 5 is a block diagram of selected elements of a data processing system potentially suitable for use as a server, client, or other network device depicted in FIG. 1.

Referring now to FIG. 5, a block diagram illustrating selected elements of an embodiment of a data processing or computing apparatus 500 for automated detecting and correction of lip sync error in an MCDN is presented. Computing apparatus 500 may be implemented as a server system, a desktop or laptop computer, a network appliance, and so forth. Moreover, elements of computing apparatus 500 may be distributed across two or more physical systems. As an example, storage elements of computer apparatus 500 may be implemented on different physical system(s) than instruction executing elements and/or instruction processing elements.

In the embodiment depicted in FIG. 5, computing apparatus 500 includes a processor 501 coupled to and having access to storage media 510. Computing apparatus 500, as depicted in FIG. 5, further includes network adapter 520 that interfaces computing apparatus 500 to a network 530. Depending upon the implementation, network 530 encompasses local area networks, an entity's intranet or other form of private network, as well as public networks including the Internet.

Computing apparatus 500, as depicted in FIG. 5, includes a peripheral adapter 506 configured to provide connectivity between processor 501 and input device 508 and output device 509. Input device 508 may represent a device for user input, such as a keyboard or a mouse, or even a video camera. Output device 509 may represent a device for providing signals or indications to a user, such as loudspeakers for generating audio signals.

Apparatus 500 as shown in FIG. 4 includes a display adapter 504 and a display device or, more simply, a display 505. Display adapter 504 may provide an interface between processor 501 and display 505. Display 505 may comply with any of various display standards for computer monitors and/or television displays.

Storage media 510 encompasses persistent and volatile media, fixed and removable media, magnetic, semiconductor, and optical media. As depicted in FIG. 5, storage media 510 stores data 560 and instructions 550, which may represent one or more sets of instructions embodying or utilized by any one or more of the methods and/or operations described herein. In the depicted example, instructions 550 include an operating system 512 and a lip sync error application 514, which may implement any of the methods, policies, and practices described above. As depicted in FIG. 5, instructions 550 may also reside, completely or at least partially, within processor 501 during execution thereof by computer apparatus 500.

What is claimed is:

1. A multimedia synchronization method, comprising:
    identifying, by a server, a packet pair comprising a video stream packet including a video packet in a video stream associated with a multimedia program and an audio stream packet comprising an audio packet in an audio stream associated with the multimedia program;
    detecting a first offset between the video stream packet and the audio stream packet at a first monitoring point in a multimedia network;
    detecting a second offset between the video stream packet and the audio stream packet at a second monitoring point of the multimedia network, wherein the video stream packet and the audio stream packet traverse different network paths between the first monitoring point and the second monitoring point;
    determining, by the server, a synchronization delta offset wherein the synchronization delta offset indicates a variation in inter-stream synchronization offset associated with the packet pair between two points in the multimedia network; and
    responsive to determining that the synchronization delta offset exceeds a predetermined threshold, initiating, at a monitoring point, a corrective action procedure, wherein the corrective active procedure includes injecting empty or null packets into the component of content that is leading or lagging as appropriate;
    wherein the audio stream packet and the video stream packet occur contemporaneously in the multimedia program and further wherein determining the synchronization delta offset includes decoding a presentation timestamp associated with the video stream packet; and
    wherein identifying the audio stream packet includes identifying the audio stream packet based on pulse code modulation data included in the audio stream packet.

2. The method of claim 1, wherein the video stream packet is encoded according to a motion picture expert group compliant video encoding.

3. The method of claim 2, wherein the audio stream packet is encoded according to a motion picture expert group compliant audio encoding.

4. The method of claim 1, wherein detecting the first offset includes:
    detecting a first network timestamp for the video stream packet and a second network timestamp for the audio stream packet; and
    calculating a timestamp difference comprising a difference between the first network timestamp and the second network timestamp.

5. The method of claim 4, wherein detecting the first network timestamp comprises assigning a network time protocol timestamp to the video stream packet.

6. The method of claim 5, wherein assigning the network time protocol timestamp to the video stream packet comprises assigning the network time protocol timestamp to the video stream packet while the video stream packet is being processed at a first monitoring point.

7. The method of claim 4, wherein determining the synchronization delta offset further comprises adjusting the timestamp difference in response to a network time protocol message indicating a network time protocol clock shift.

8. A system comprising:
    a processor; and
    a non-transitory computer readable storage medium including processor-executable instructions that, when executed by a processor, cause the processor to perform operations comprising:
        identifying, by a server, a packet pair comprising a video stream packet including a video packet in a video stream associated with a multimedia program and an audio stream packet comprising an audio packet in an audio stream associated with the multimedia program;
        detecting a first offset between the video stream packet and the audio stream packet at a first monitoring point in a multimedia network;
        detecting a second offset between the video stream packet and the audio stream packet at a second monitoring point of the multimedia network, wherein the video stream packet and the audio stream packet traverse different network paths between the first monitoring point and the second monitoring point;
        determining, by the server, a synchronization delta offset wherein the synchronization delta offset indicates a variation in inter-stream synchronization offset associated with the packet pair between two points in the multimedia network; and
        responsive to determining that the synchronization delta offset exceeds a predetermined threshold, initiating, at a monitoring point, a corrective action procedure, wherein the corrective active procedure includes injecting empty or null packets into the component of content that is leading or lagging as appropriate;
        wherein the audio stream packet and the video stream packet occur contemporaneously in the multimedia program and further wherein determining the synchronization delta offset includes decoding a presentation timestamp associated with the video stream packet; and wherein identifying the audio stream packet includes identifying the audio stream packet based on pulse code modulation data included in the audio stream packet.

9. The system of claim 8, wherein the video stream packet is encoded according to a motion picture expert group compliant video encoding.

10. The system of claim 9, wherein the audio stream packet is encoded according to a motion picture expert group compliant audio encoding.

11. The system of claim 8, wherein determining the first offset includes:

determining a first network timestamp for the video stream packet and a second network timestamp for the audio stream packet; and calculating a timestamp difference comprising a difference between the first network timestamp and the second network timestamp.

12. The system of claim 11, wherein determining the first network timestamp comprises assigning a network time protocol timestamp to the video stream packet.

13. The system of claim 12, wherein assigning the network time protocol timestamp to the video stream packet comprises assigning the network time protocol timestamp to the video stream packet while the video stream packet is being processed at a first monitoring point.

14. The system of claim 13, wherein determining the synchronization delta offset further comprises adjusting the timestamp difference in response to a network time protocol message indicating a network time protocol clock shift.

15. A non-transitory computer readable medium including processor-executable instructions that, when executed by the processor, cause the processor to perform operations, comprising:

identifying, by a server, a packet pair comprising a video stream packet including a video packet in a video stream associated with a multimedia program and an audio stream packet comprising an audio packet in an audio stream associated with the multimedia program;

detecting a first offset between the video stream packet and the audio stream packet at a first monitoring point in a multimedia network;

detecting a second offset between the video stream packet and the audio stream packet at a second monitoring point of the multimedia network, wherein the video stream packet and the audio stream packet traverse different network paths between the first monitoring point and the second monitoring point;

determining, by the server, a synchronization delta offset wherein the synchronization delta offset indicates a variation in inter-stream synchronization offset associated with the packet pair between two points in the multimedia network; and responsive to determining that the synchronization delta offset exceeds a predetermined threshold, initiating, at a monitoring point, a corrective action procedure, wherein the corrective active procedure includes injecting empty or null packets into the component of content that is leading or lagging as appropriate;

wherein the audio stream packet and the video stream packet occur contemporaneously in the multimedia program and further wherein determining the synchronization delta offset includes decoding a presentation timestamp associated with the video stream packet; and wherein identifying the audio stream packet includes identifying the audio stream packet based on pulse code modulation data included in the audio stream packet.

16. The non-transitory computer readable medium of claim 15, wherein determining the synchronization delta offset includes:

determining a first network timestamp for the video stream packet and a second network timestamp for the audio stream packet; and calculating a timestamp difference comprising a difference between the first network timestamp and the second network timestamp.

* * * * *